United States Patent [19]

Bodimer et al.

[11] 4,380,288

[45] Apr. 19, 1983

[54] CONVEYOR

[75] Inventors: Theodore B. Bodimer; Joseph S. David, both of Franklin; Alexander W. Calder, Pittsburgh, all of Pa.

[73] Assignee: Joy Manufacturing Company, Pittsburgh, Pa.

[21] Appl. No.: 862,254

[22] Filed: Dec. 19, 1977

Related U.S. Application Data

[63] Continuation of Ser. No. 701,770, Jul. 2, 1976, abandoned.

[51] Int. Cl.³ ............................................. B65G 15/08
[52] U.S. Cl. .................................. 198/820; 198/838; 198/845

[58] Field of Search ............... 198/300, 303, 678, 820, 198/821, 822, 818, 860–862, 864, 838, 845; 299/18, 43–45, 56, 64–67; 267/47, 48

[56] References Cited

U.S. PATENT DOCUMENTS

| 640,103 | 12/1899 | Cowley | 198/821 |
| 706,294 | 8/1902 | Beck | 198/818 |
| 1,673,526 | 6/1928 | Newdick | 198/520 |
| 2,882,043 | 4/1959 | Benz | 267/47 |
| 3,707,218 | 12/1972 | Payne et al. | 198/838 |
| 3,920,115 | 11/1975 | Craggs | 198/862 |

Primary Examiner—Joseph E. Valenza
Attorney, Agent, or Firm—Raymond W. Augustin

[57] ABSTRACT

An elongated conveyor having conveying and return traverses formed by an endless conveying element orbitally movable through a closed horizontally extending loop, the length and direction of which may be varied.

5 Claims, 9 Drawing Figures

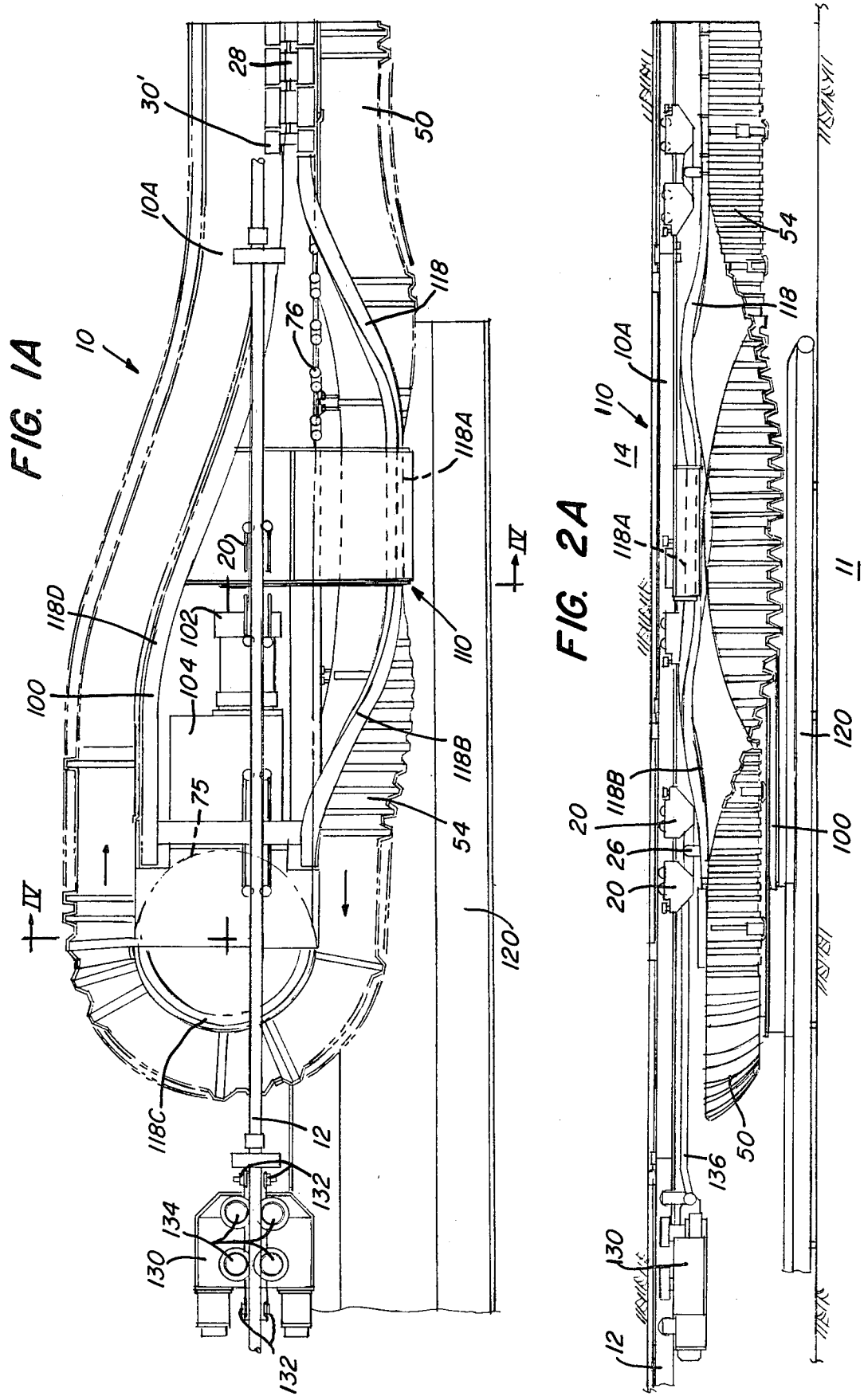

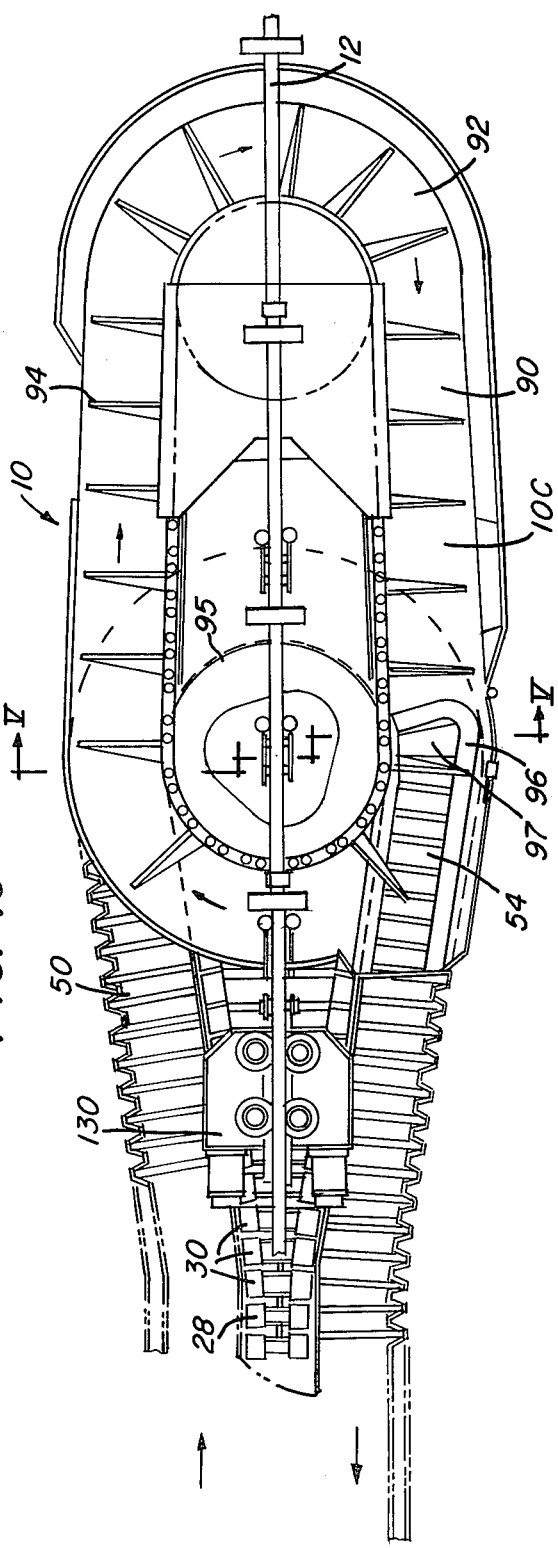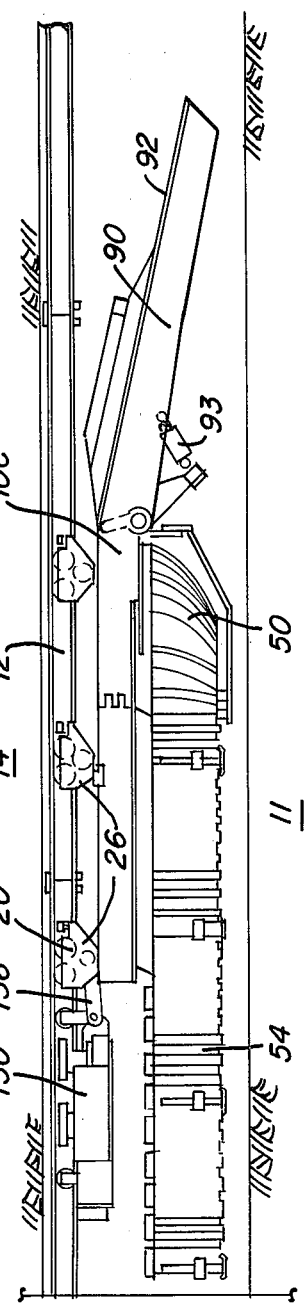

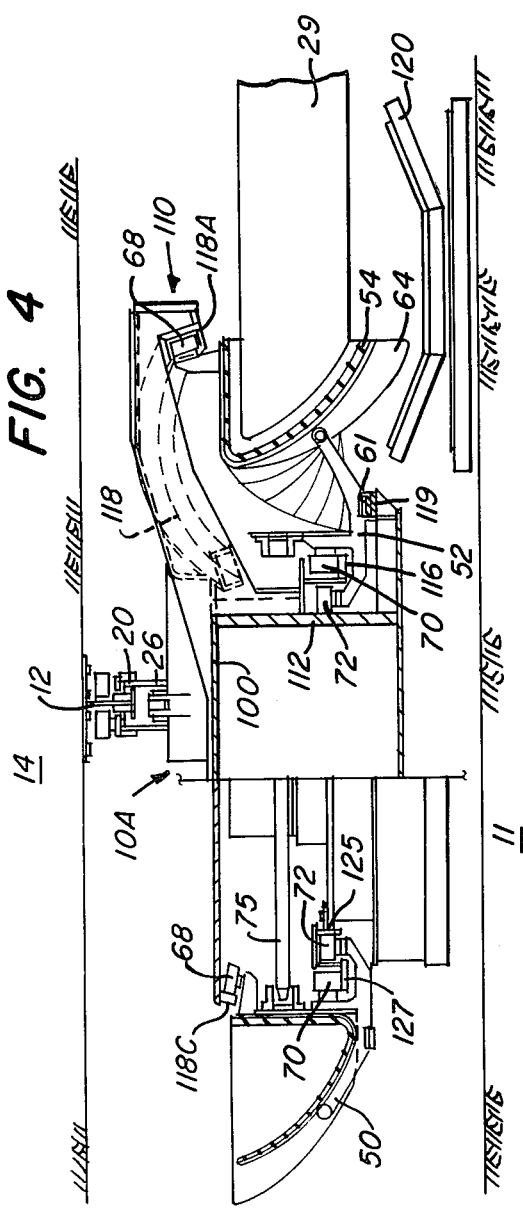
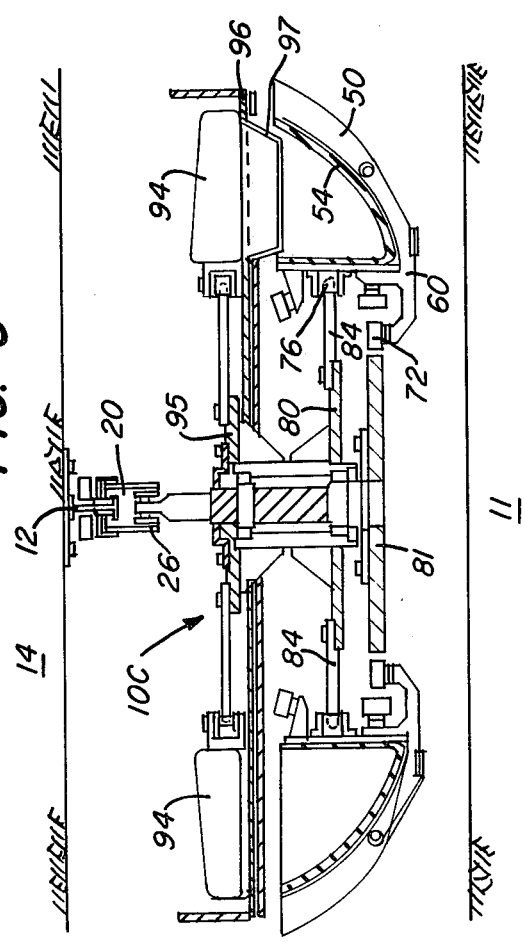

CONVEYOR

This is a continuation of application Ser. No. 701,770, now abandoned, filed July 2, 1976.

The present invention relates to conveyor systems for continuously conveying material, especially solid lump or granular materials such as coal, from one point to another. Underground coal mining, for example, requires continuous transport of the mined coal from various locations in the mine to a main haulage system such as a stationary panel belt conveyor as mining proceeds. In practice continuous mining machines commonly used for underground coal mining are frequently moved through the mine galleries from one face location to another during mining operations since extended continuous mining at a single location is not feasible in view of such problems as dust and roof control. Accordingly, conveyor systems for underground coal transport must be capable of following the continuous miner in selectively variable curvilinear paths for continuously transporting mined coal to the main haulage system. Various prior conveyor systems to accomplish this purpose have been proposed such as those shown in U.S. Pat. Nos. 3,701,411; 3,707,218, and 3,107,778, all of which teach an endless conveyor belt having an upper conveying traverse overlying a lower return traverse. Although such conveying systems have generally served the purposes intended, they have nonetheless often been subject to serious deficiencies. For example, the overlying or stacked conveyor traverses of prior systems often require at least twice the vertical height of a single traverse whereby such systems are inconvenient or unworkable in many low coal seams being mined today. Additionally, in prior conveyor systems the conveyor belt is inverted during the return traverse thereof and considerable coal spillage beneath the conveyor thus results as residual coal particles adhering to the downwardly facing belt after coal discharge are dislodged therefrom during the return run.

These and other deficiencies of prior conveyor systems are alleviated by the present invention which provides an endless flexible conveyor belt driven in a closed horizontally extending loop to define conveying and return traverse thereof on laterally opposite sides of a central elongated support structure such that the conveying portions of the belt are continuously upwardly open during both the conveying and return traverses thereof whereby spillage of residual coal is greatly reduced. Furthermore, the closed, horizontally extending loop arrangement provides a system having a total vertical height of a single traverse rather than the double height of overlying traverses as in the prior art. The present invention additionally provides a conveyor system of the type generally described which is suitably mobile to be bodily movable through the galleries of the mine as by being suspended from the mine roof by a monorail support system.

It is therefore an object of the present invention to provide a conveyor system with an elongated support and a troughed endless belt which is orbitally movable in a closed horizontal loop with conveying and return traverses thereof on opposite lateral sides of the support.

Another object of the invention is to provide a conveyor system which is bodily movable to permit the repositioning thereof at will.

It is a further object of the invention to provide a conveyor system having a troughed endless belt orbitally movable in a closed horizontal loop on opposite lateral sides of a flexible support which is bodily movably suspended from support means affixed thereabove whereby the conveyor is movable in a variable curvilinear path.

It is a still further object of the invention to provide a conveyor system having a total vertical height determined by the structure required for a single conveyor belt traverse.

An additional object of the invention is to provide a conveyor system comprised of modular sections capable of having sections added thereto for increasing the length of the conveyor system.

These and other objects and advantages of the invention are more fully specified in the following description of a presently preferred embodiment of the invention with reference to the accompanying figures wherein:

FIGS. 1A, 1B and 1C are top plan views of the discharge, intermediate and loading portions, respectively, of a conveyor constructed according to the principles of the instant invention;

FIGS. 2A, 2B and 2C are side elevations of the conveyor portions shown in FIGS. 1A, 1B, and 1C, respectively;

FIG. 4 is a transverse section of the conveyor discharge portion taken on line 4—4 of FIG. 1A; and FIG. 5 is a transverse section of the loading portion of the conveyor taken on line 5—5 of FIG. 1C.

Figure 1B:
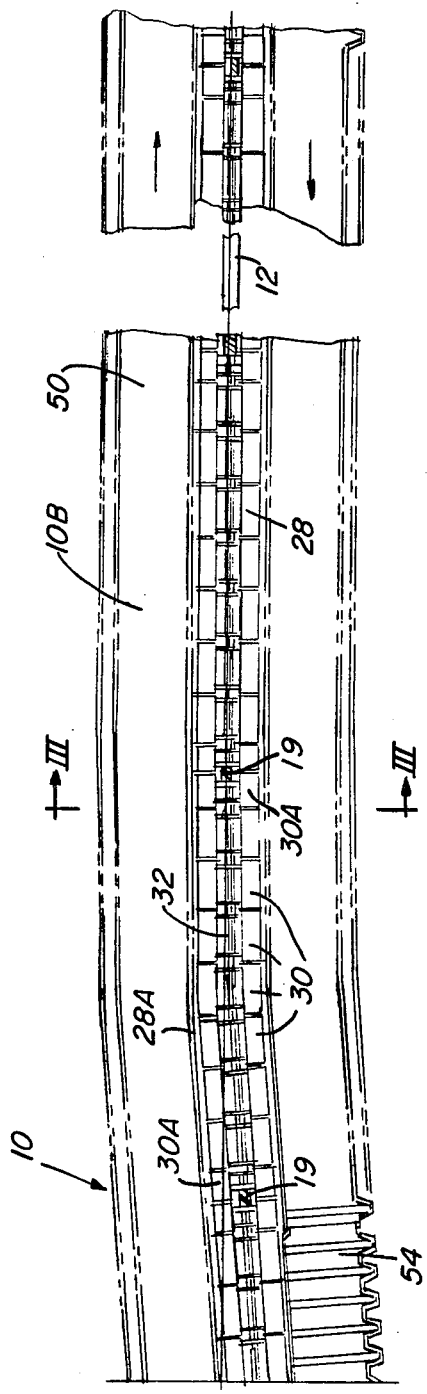

There is generally indicated at 10 in FIGS. 1A, B and C an endless belt conveyor system constructed according to the principles of the instant invention and comprising respective discharge and loading portions 10C and 10A shown in FIGS. 1A and 1C, respectively, and an elongated flexible intermediate portion 10B communicating between portions 10A and 10C and shown in FIG. 1B. The respective conveyor portions 10A, 10B and 10C form an elongated belt conveyor system operable for conveying material from one point to another through a selectively variable path. An endless, driven conveying element 50 extends on both transverse sides of portion 10B and around the ends of portions 10A and 10C to form a generally horizontally extending loop including loop portions extending parallel to the longitudinal extent of portion 10B to provide a conveying traverse along one lateral side thereof and a return traverse along the other lateral side thereof.

Figure 2B:
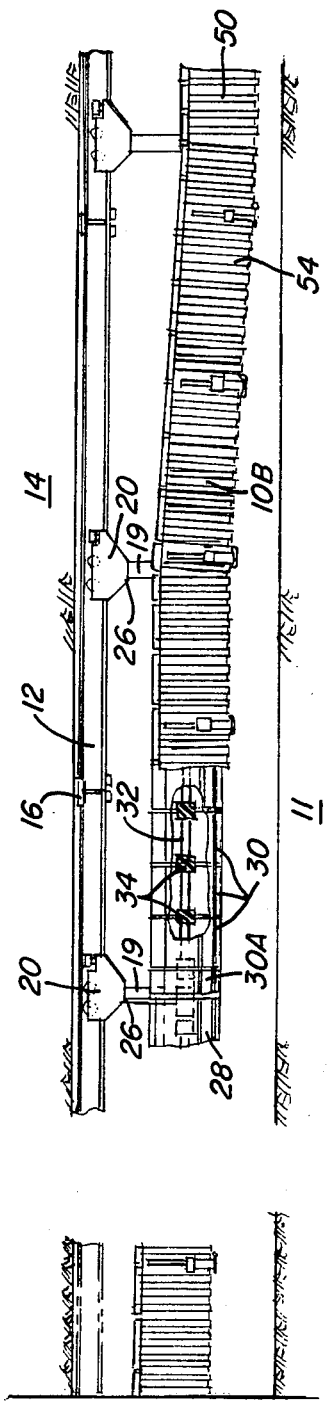
Figure 3:
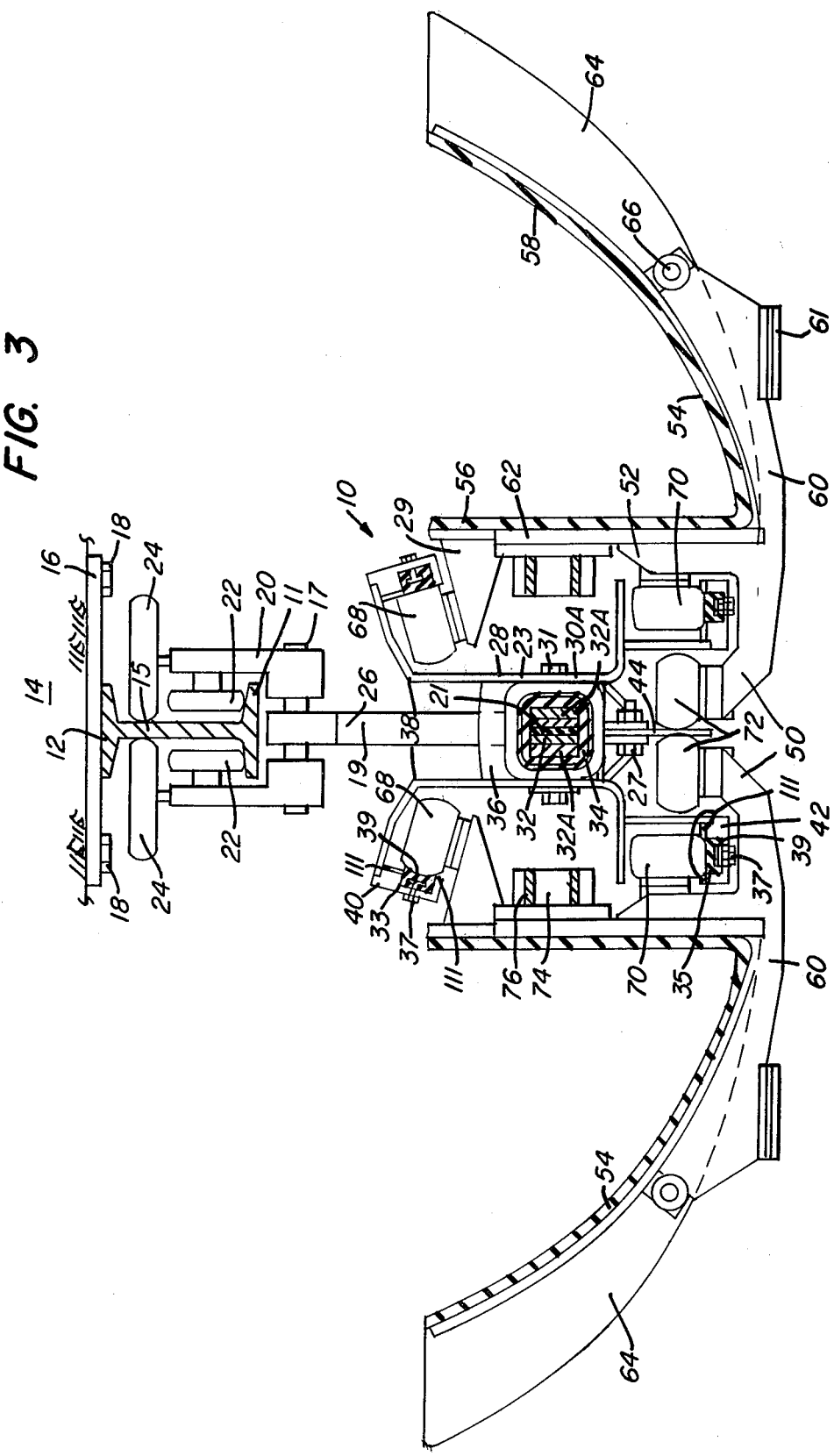
FIG. 3 is a transverse section of the intermediate portion of the conveyor system taken on line 3—3 of FIG. 1B.

Although in practice conveyor 10 may be suitably supported by various ground based or overhead structures, the conveyor 10 as shown is supported above the floor 11 of a mine by a plurality of hanger supports 26 (FIGS. 2B and 3) including roller assemblies 20 rollingly engaging an elongated curvilinear overhead rail 12 assembled from elongated I-beam sections with each such section being secured to a mine roof 14 in any suitable manner such as by a plurality of axially spaced plates 16 suitably rigidly secured to the upper flange of each I-beam section and bolted to the mine roof 14 by roof bolts 18 so as to define a curvilinear path along roof 14.

Each roller assembly 20 has a suitable plurality of laterally spaced pairs of support rollers 22 rotatably disposed on horizontal rotational axes and rollingly engaging the upper surface of the lower flange 11 of rail 12 on opposite sides of a central, vertically extending web portion 15 thereof. Each roller assembly 20 further includes a pair of laterally spaced guide rollers 24 having vertical rotational axes and engagable with laterally opposite sides of web portion 15 to prevent sideways shifting or tilting of the conveyor 10 as the roller assemblies 20 move along rail 12.

Each of the hanger supports 26 further includes an elongated support bar 19 pivotally affixed to each roller assembly 20 as by a laterally disposed pivot pin 17 and extending vertically downwardly therefrom to supportingly engage the respective conveyor portions 10A, B and C in a manner to be described hereinbelow whereby the conveyor 10 is bodily movably suspended from rail 12 for movement along the path of rail 12 above mine floor 11.

To be movable generally in the curvilinear path defined by rail 12 the major extent of conveyor 10 must be laterally flexible. Accordingly, the conveyor loading and discharge portions 10A and 10C are shown as having rigid structural frames, while the elongated intermediate portion 10B, which may be of any suitable and desired length, has an elongated, laterally flexible frame or conveyor support spine 28 suitably secured at longitudinal intervals to the lower ends of the support rods 19. The spine 28 is comprised of a plurality of elongated support spine sections 28A joined end-to-end at support rods 19 and extending between adjacent rods 19 (FIG. 1B). Each conveyor spine section 28A includes a plurality of closely spaced and axially aligned identical vertebra sections 30 disposed axially intermediate specially formed end vertebra sections 30A, and a laterally flexible spine bar 32 extending axially within the aligned vertebra sections 30 and 30A and comprised of a plurality of laterally juxtaposed and axially aligned elongated bars 32A. The axial ends of bar 32 are rigidly secured to the respective end vertebrae 30A as by laterally extending bolt and nut assemblies 31 to form the spine section 28A. Suitable elastomeric spacers 34 such as rubber discs are provided axially intermediate each adjacent pair of vertebra sections 30 and encompassing the spine bar 32 to provide suitable axial spacing between adjacent ones of the vertebra sections which is necessary to prevent mechanical interference therebetween during lateral flexing of the spine 28. The discs 34 additionally provide a desirable axial cushioning between adjacent vertebrae for a degree of axial resiliency, and aid in maintaining vertebrae alignment. Each spine section 28A as described is suitably, pivotally secured adjacent the axial ends thereof to the lower ends of adjacent pairs of support bars 19 as by laterally extending pivot pins (not shown) passing transversely through the lower end of the respective bar 19 and through laterally spaced side portions of each vertebra section 30A. Each bar 19 pivotally supports the adjacent axial ends of the two sections 28A in axial alignment to provide the elongated spine 28 supported from roof 14 as described. Limited vertical pivoting between the conveyor spine sections 28A and the respective support bars 19 about the hereinabove described pinned connections therebetween is provided for purposes to be described hereinbelow.

Each vertebra section 30, 30A includes a pair of rigid, elongated formed guideways 38 formed to guide and support the endless conveyor element 50 therein and rigidly affixed to laterally opposite sides of a generally annular housing portion 36 which tightly encompasses spine bar 32. Laterally resilient means such as an elongated elastomeric strip 21 may be included intermediate ones of bars 32A to provide a laterally outward bias thereon for a suitably tight fit between the spine bar 32 and housing 36.

Each guideway 38 includes an upper flange portion 40 formed generally vertically above a lower flange portion 42, and a generally vertically extending side portion 23 extending therebetween by which the guideways 38 are rigidly affixed to housing portion 36 to form the unitary vertebra sections.

An additional vertically downwardly extending elongated guideway 44 extends longitudinally between the ends of each spine section 28A to be uniformly flexible therewith as by being fixedly secured subjacent the housing portion 36 of respective end vertebra 30A by a nut and bolt assembly 27 and extending therebetween within aligned vertical slots (not shown) in the lower extent of the housing portions 36 of each intermediate vertebra 30.

The flange portions 40, 42 of each guideway 38 have extending therealong an elongated elastomeric track 33, 35, respectively, formed of neoprene or nylon for example and including a longitudinally extending T-slot 39 formed therein to receive cooperably formed portions of fasteners 37 affixed to the flanges 40, 42 centrally in each vertebra 30, 30A. The fasteners 37 securing tracks 33, 35 to the axially central vertebra 30 in each spine section 28A are tightly fitted within slots 39 to fixedly secure tracks 33, 35. However, all other fasteners 37 are loosely fitted into slots 39 to permit axial movement between the tracks 33, 35 and vertebra sections 30 during lateral flexing of spine 28. Accordingly, tracks 33, 35 are suitably constrained to flex uniformly with the flexing of each spine section 28A to provide flexible, continuous guide tracks for cooperably located conveyor support rollers as hereinbelow described. Suitable bridges such as formed flange portions 37, 39 shown adjacent the laterally opposed sides of tracks 33, 35, respectively, are provided to bridge the gaps between longitudinally adjacent track sections 33, 35 for smooth rolling of the conveyor support rollers between adjacent spine sections 28A. The tracks 33, 35 together with the guideways 44 of the aligned spine sections 28A form in combination an elongated, flexible guideway means for the purpose of supporting and guiding conveyor element 50 for movement thereof orbitally along each transverse side of the support spine 28 and about the end portions 10A, 10C in a manner to be described.

Conveyor element 50 includes a plurality of brackets 52 affixed at longitudinally spaced locations along an endless flexible conveyor belt 54 having a vertically extending inner side portion 56 and a corrugated or pleated outer arcuate portion 58 extending generally outward and upward from the lower end of side portion 56 to form an upwardly open trough for conveying material therein. While it is possible to form the belt 54 in a single piece with the ends thereof connected together, it is preferred to assemble belt 54 from a plurality of elongated belt portions secured together end-to-end at the locations of the brackets 52, and also secured to the brackets 52 for support of belt 54. Furthermore, intermediate the brackets 52 it is preferred to further support the belt 54 as by means of suitable ribs secured to the exterior of or molded into the belt 54 between some or all of the pleats therein. It is evident that the described pleats permit the belt outer side 58 to expand or contract as the belt is run through a curve and also to expand as the belt moves around the ends of the conveyor portions 10A and 10C.

Each bracket 52 includes a generally laterally extending lower support portion 60 rigidly affixed adjacent the lower end of a vertically extending support portion 62. A pivotal bracket portion 64 conforming to the cross sectional shape of belt 54 is pivotally connected to the laterally outer end of bracket portion 60 as at 66 whereby the belt 54, which is suitably fixedly secured at intervals to the bracket portions 64, is adapted to be tilted outward and downward for material discharge as shown in FIG. 4. A roller support arm 29 rigidly affixed to and extending inwardly from the upper end portion of member 64 rotatably carries thereon a support roller 68 adapted to rollingly engage the track 33 for partial support of belt 54. Support rollers 70 and 72 are similarly rotatably secured to a lower part of bracket portion 62 and an inward end of bracket portion 60, and positioned so as to be rollingly engagable upon track 35 and the guideway 44, respectively. It will be seen that rollers 68 and 72 provide support for the torque loading which results from supporting the belt 54 and the material carried thereby in cantilever fashion at points spaced laterally inwardly from the belt 54 itself. The rollers 70 provide vertical support to carry the weight of the belt 54 and the belt load.

A coupling structure 74 is suitably rigidly secured to the inner side of each of the vertically extending bracket portions 62 to suitably couple each respective bracket 52 to a known driving element such as an endless chain 76 which is coextensive with belt 54.

The loading and discharge portions 10C, 10A of conveyor 10 are supported from rail 12 in an entirely similar manner as the intermediate portion 10B by hanger supports 26 including roller assemblies 20 which engage the rail 12. Adjacent the loading portion 10C (FIGS. 1C, 2C and 5) the individual vertebrae 30 of spine 28 progressively increase in width to guide the conveying element 50 to the outer periphery of a sprocket wheel 80 whereat circumferentially spaced and radially outwardly extending sprocket arms 84 of the sprocket 80 supportingly engage chain 76, to support conveying element 50 in its movement around sprocket wheel 80 from one transverse side to the opposite transverse side of the support spine 28. A conveyor loader assembly 90 is located generally above and extends ahead of sprocket 80, and includes a generally horizontally extending loading platform 92 which may be vertically positionable as by hydraulic piston and cylinder assembly 93. An endless flight conveyor 94 is suitably carried for orbital movement about platform 92 to carry material deposited therein to a rearward dumping platform portion 96. The loading conveyor 94 may be driven by any suitable means but is preferably driven by a sprocket wheel 95 positioned coaxially above sprocket wheel 80 and movable concomitantly therewith. The dumping platform 96 as shown comprises a chute 97 formed in platform 92 above the upwardly open belt 54 whereby material conveyed rearwardly from the front portion of loading platform 92 by means of conveyor 94 is gravitationally loaded through chute 97 onto belt 54 which continuously passes therebeneath. The chute 97 is located such that the belt 54 receives no material therein until it has passed completely around sprocket 80 since material loaded into the belt before or during traverse thereof about sprocket 80 would interfere with longitudinal extension and contraction of the accordian pleated outer belt periphery. It is noted that as the conveying element 50 passes around sprocket wheel 80 the only support necessary therefor is provided by arms 84 engaging chain 76 as tension force urges the conveying element radially inwardly of sprocket 80. If desired, supplemental support, may be provided, such as a guideway means 81 for supporting and guiding roller 72 about loading end 10C. Ideally the support rollers 68, 70 and 72 reengage respective tracks 33, 35 and guideways 44 upon leaving sprocket 80 and before any substantial loading of material onto the belt 54 through chute 97.

The discharge portion 10A (FIGS. 1A, 2A and 4) comprises a rigid frame 100 which supports a primary driving motor 102 to drive a sprocket wheel 75 through a suitable reducing transmission 104 operatively connected between driving motor 102 and sprocket wheel 75. Discharge end portion 10A includes a discharge station 110 supported by frame 100 on the conveying traverse side of the support spine 28 and comprised of a vertically extending wall portion 112 of frame 100 having the lower end thereof axially aligned with guideway 44 (FIG. 3) of the last vertebra section 30' contiguous with the discharge assembly portion 10A to form a continuing guideway for rollers 72 around the discharge end 10A. In a like manner, a horizontally extending flange portion 116 of frame 100 is suitably aligned with track 35 at vertebra 30', and an upper roller track 118 affixed to frame 100 is aligned with track 33 at vertebra 30' to provide continuing guideways for guiding rollers 70 and 68, respectively, around discharge end 10A. The track 118 is suitably curved, for example, as a helix or spiral having an axis coincident with the axis of pivot 66 on bracket 52 to guide the rollers 68 outwardly to position 118A along track 118 as shown in FIG. 4. As belt 54 moves through discharge station 110 bracket portion 64 and the portion of belt 54 connected thereto are rotated approximately 90° about pivot 66 from the normal upright position thereof into a discharge position whereat the material carried by belt 54 discharges onto, for example, a panel belt 120 for ultimate export from the mine. If desired a suitable formed plough 29 or other structure may be employed in conjunction with the discharge station 110 to ensure complete discharge of material from the belt 54. After belt discharge the rollers 68 are guided back to the normal position thereof along a reverse curved track portion 118B (FIG. 1A) to pivot the belt 54 and bracket portions 64 back to the upright material conveying position. Upon returning belt 54 to the upright position track 118B merges with a circumferential track portion 118C to guide rollers 68 around drive sprocket 75 and thence onto a return track portion 118D on the laterally opposite side of discharge portion 10A. The opposite longitudinal end of return track portion 118D is aligned with track 33 on the opposite side of end vertebra 30' to provide a continuing support and guide for rollers 68 throughout their movement about the discharge end portion 10A. Likewise, the roller guides formed by wall 112 and flange 116 are continued as tracks 125 and 127, respectively, (FIG. 4) for continuing support and guiding of respective rollers 72 and 70 throughout their travel about discharge end 10A.

Because support for bracket portion 60 is not available from rollers 68 during their traverse of track 118, an elongated upwardly facing skid plate 119 is provided on frame 100 subjacent cooperably located skid plates 61 on bracket portions 60 and extending throughout the length of track portion 118 118A and 118B to provide support for brackets 60 until the end of the discharge zone whereat rollers 68 have returned to their normal tracking position.

The entire conveyor system 10 is propelled along rail 12 by a plurality of axially spaced motors 130 (FIGS. 1A, 1B), preferably electrically energized. Motors 130 are suspended from rail 12 in much the same manner as roller assemblies 20 as by support rollers 132 disposed on horizontal rotational axes to rollingly engage the lower flange of rail 12, and web portion engaging power rollers 134 disposed on vertical rotational axes on opposite sides of web portion 13 and operatively connected to be driven by motors 130 to propel the motors 130 along rail 12. Each motor 130 is connected to an adjacent roller assembly 20 by means of a push-pull rod 136 for propelling the conveyor 10 along the rail 12 with the motors 130.

For operation in one suitably adapted environment, rail 12 is affixed to a mine roof along a selected curvilinear path for access to selected face areas in the mine galleries. Motors 130 are energized by local or remote controls to move the conveyor 10 along rail 12 to position loading platform 92 thereof directly adjacent the coal discharge mechanism of a mining machine (not shown) or the discharge of any other suitable known discharge device such as a shuttle car or a loader breaker to receive coal therefrom. Coal loaded onto loading platform 92 is conveyed by means of flight conveyor 94 to chute 97 where it falls onto the orbitally moving conveyor belt 54. The coal is conveyed by belt 54 along the conveying traverse of the conveyor 10 in the direction of the arrows indicated in FIGS. 1A, 1B and 1C toward discharge end 10A. As the individual support brackets 60 reach discharge station 110 at the end of the conveying traverse the upper rollers 68 are are guided outwardly by curved track 118 for discharge of the coal from the belt 54 onto panel belt 120 and thereafter are returned to the normal upright position by the reverse curved track portion 118B as described. Chain 76 then engages drive sprocket 75 and passes therearound and along the opposite side of discharge portion 10A to the opposite side of spine 28 for a return traverse of belt 54 therealong toward loading portion 10C in the upright position. The conveyor element 50 may be orbitally driven by motor 102 simultaneously with movement of conveyor 10 along rail 12 to continuously maintain a suitable location for receiving coal.

According to the description hereinabove there is provided an elongated conveyor apparatus which is suitably flexible to follow a selected curvilinear path between a loading point and a discharge point for conveying material therebetween. The disclosed conveyor additionally provides the advantages of an endless conveying element orbitally driven in a generally horizontally extending loop whereby conveying and return traverses are laterally spaced such that the total height of the conveyor apparatus is that of a single traverse. Additionally, this structure provides a conveying element which is upright at all times during its orbital travel whereby material spillage is greatly reduced.

Notwithstanding the description hereinabove of a particular preferred embodiment to the invention it is to be noted that this invention is susceptible of various alternative embodiments with numerous modifications without departing from the broad spirit and scope thereof. For example: alternate loading and discharge arrangements may be provided including arrangements not necessarily integral with the conveyor portion 10B; chain 76 may be driven at either or both ends of the conveyor as desired; the structure and cross sectional form of belt 54 may be varied within a wide design latitude; the elastomer strip 21 in spine bar 32 may be any suitably outwardly biased element; and the like. These and other embodiments and modifications having been envisioned and anticipated by the inventors it is respectfully submitted that this invention should be construed broadly and limited only by the scope of the claims appended hereto.

What is claimed is:

1. A conveying apparatus comprising: an elongated frame including an elongated, endless guide means; a conveying means coextensive with said guide means and including an endless, troughed conveying element and a support means; said conveying means being orbitally movable with respect to said guide means through an elongated endless path located laterally adjacent said guide means in such a manner that seriatim portions of said conveying element traverse, in sequence, at least a first elongated portion of said endless path, a discharge portion of said endless path and a second elongated portion of said endless path, wherein a major extent of said first and second elongated portions of said endless path extend longitudinally adjacent the respective laterally opposite sides of said frame, said support means being cooperable with said guide means and said conveying element for cantilever support of said conveying element with respect to said guide means at least during movement of said conveying means through said first elongated portion of said endless path; and said support means including a portion thereof cooperable with said guide means and said conveying element to provide support for said seriatim portions of said conveying element with respect to said guide means during traverse thereby of said elongated and said discharge portions of said endless path and to effect movement of said seriatim portions of said conveying element from a first orientation thereof to a second orientation thereof for discharge of material from said seriatim portions during traverse thereby of said discharge portion of said endless path.

2. A conveying apparatus as claimed in claim 1 wherein said seriatim portions of said conveying element pass through said major extents of said first and second elongated portions of said endless path in a material carrying orientation.

3. A support means for supporting an endless, troughed conveying element, said support means comprising an elongated frame including an elongated intermediate portion extending longitudinally intermediate a pair of terminal end portions of said frame; said frame including endless guideway means extending longitudinally adjacent the laterally opposite sides of said intermediate portion and around said terminal end portions of said frame; a plurality of spaced apart support bracket means cooperably engageable with said guideway means and extending laterally outward therefrom for cantilever support of respective seriatim portions of such a conveying element with respect to at least a major longitudinal extent of said guideway means in a respective longitudinally extending portion of an endless path defined laterally outwardly adjacent said guideway means; and said support bracket means being orbitally movable with respect to said guideway means for guiding the respective seriatim portions of such conveying element for orbital movement thereof about such an endless path.

4. A support means as claimed in claim 3 additionally including an endless drive element connected to at least some of said plurality of support bracket means and drivingly engageable with a drive means for driving said bracket means and said conveying element in such orbital movement about such endless path.

5. A support means as claimed in claim 3 wherein said elongated intermediate portion of said frame includes a plurality of axially adjacent, relatively movable vertebrae elements and an elongated, laterally flexible spring means extending axially of and supportingly engaging said plurality of vertebrae elements.

* * * * *